(12) United States Patent
Petrovicky et al.

(10) Patent No.: US 9,841,982 B2
(45) Date of Patent: Dec. 12, 2017

(54) LOCATING IMPORT CLASS FILES AT ALTERNATE LOCATIONS THAN SPECIFIED IN CLASSPATH INFORMATION

(75) Inventors: Lukas Petrovicky, Most (CZ); Jiri Sedlacek, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 299 days.

(21) Appl. No.: 13/034,507

(22) Filed: Feb. 24, 2011

(65) Prior Publication Data

US 2012/0222023 A1    Aug. 30, 2012

(51) Int. Cl.
  *G06F 9/445*    (2006.01)
  *G06F 9/455*    (2006.01)

(52) U.S. Cl.
  CPC ...... *G06F 9/44521* (2013.01); *G06F 9/45504* (2013.01)

(58) Field of Classification Search
  CPC .......................... G06F 9/44504; G06F 9/44521
  USPC ......................................................... 717/166
  See application file for complete search history.

(56) References Cited

U.S. PATENT DOCUMENTS

| | | | |
|---|---|---|---|
| 6,470,494 B1 | 10/2002 | Chan et al. | |
| 6,856,998 B2 * | 2/2005 | Yanagi et al. | 707/999.103 |
| 6,915,511 B2 * | 7/2005 | Susarla et al. | 717/166 |
| 6,973,646 B1 * | 12/2005 | Bordawekar et al. | 717/146 |
| 7,316,010 B1 * | 1/2008 | Daynes et al. | 717/140 |
| 7,774,775 B2 * | 8/2010 | Robsahm | 717/174 |
| 8,276,125 B2 * | 9/2012 | Fan et al. | 717/130 |
| 8,397,227 B2 * | 3/2013 | Fan et al. | 717/166 |
| 2003/0158832 A1 * | 8/2003 | Sijacic | G06F 8/34 707/999.001 |
| 2006/0117320 A1 * | 6/2006 | Garms et al. | 718/105 |
| 2006/0206458 A1 * | 9/2006 | Tyma | 707/3 |
| 2007/0061794 A1 * | 3/2007 | Mausolf et al. | 717/162 |
| 2007/0106716 A1 * | 5/2007 | Corrie | G06F 8/67 |
| 2007/0169072 A1 * | 7/2007 | Corrie | G06F 9/44563 717/166 |
| 2007/0180433 A1 * | 8/2007 | Ghobrial et al. | 717/136 |
| 2007/0245331 A1 * | 10/2007 | Daynes | G06F 9/44521 717/166 |
| 2009/0144714 A1 * | 6/2009 | Fan et al. | 717/166 |
| 2009/0172636 A1 | 7/2009 | Griffith et al. | |
| 2010/0293537 A1 * | 11/2010 | Broussard | G06F 8/68 717/170 |
| 2011/0197183 A1 * | 8/2011 | Wang | 717/166 |
| 2012/0102473 A1 * | 4/2012 | Lebert | 717/151 |
| 2013/0067446 A1 * | 3/2013 | Mausolf et al. | 717/166 |

OTHER PUBLICATIONS

Marinho et al., "Extending a Software Component Repository to Provide Services," Springer-Verlag, 2009, 11pg.*
Ossher et al., "Automated Dependency Resolution for Open Source Software," IEEE, 2010, 11pg.*

* cited by examiner

*Primary Examiner* — Ryan Coyer
(74) *Attorney, Agent, or Firm* — Lowenstein Sandler LLP

(57) ABSTRACT

An automatic runtime dependency lookup method may load a class, while executing a computer application program. A class loader determines if the class is found at a first location specified by classpath information. If the class is not found at the first location, the class loader automatically reads repository information to determine an alternate location for the class and locates the class at the alternate location.

12 Claims, 4 Drawing Sheets

LOCATING IMPORT CLASS FILES AT ALTERNATE LOCATIONS THAN SPECIFIED IN CLASSPATH INFORMATION

TECHNICAL FIELD

This disclosure relates to the field of class dependencies in a software environment and, in particular, to automatic runtime dependency lookup.

BACKGROUND

Computer application programs may be written in any number of computer programming languages, such as for example, the Java programming language. A computer application program written in the Java programming language may be referred to as a Java application. A Java application may be formed from a set of pieces of computer code called classes. Each class may be part of a package, containing multiple classes. A Java Virtual Machine (JVM) may run on a host machine as part of the Java application in order to execute the instructions of the Java application. When the Java application is started (e.g., in response to a command from a user), the JVM may identify a list of classes used by the Java application. The list of classes may be found as part of one or more Java class files in the Java application. A class loader in the JVM may access a classpath (i.e., a runtime list of classes and libraries (called "JAR files")) to determine a location of the classes used by the Java application. This process may be referred to as "class-loading."

In certain cases, the location of a class specified in the classpath may be incorrect, causing the classloading to fail. In current systems, when classloading fails, the JVM reports an error by throwing the ClassNotFoundException. When this error occurs, the application is usually terminated as it cannot function properly without the missing class or classes. Seeing a ClassNotFoundException is usually a sign of a poorly configured classpath, but it is undesirable and can take a significant amount of time to correct.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for automatic runtime dependency lookup. A computer application program, such as for example, a Java application may depend on one or more import classes in order to function properly. An import class may include a set of pieces of computer code that are found at a separate location from the main code for the application. The location of the import classes may be defined in classpath information stored in a host machine running the application. If the location of an import class is incorrect (i.e., the import class is not found at the specified location), an improved class loader may read repository information which stores alternative location information for the import class. At runtime, the class loader may automatically look in the alternate location for the import class and update the classpath information to prevent the error from occurring again in the future.

Figure 1:
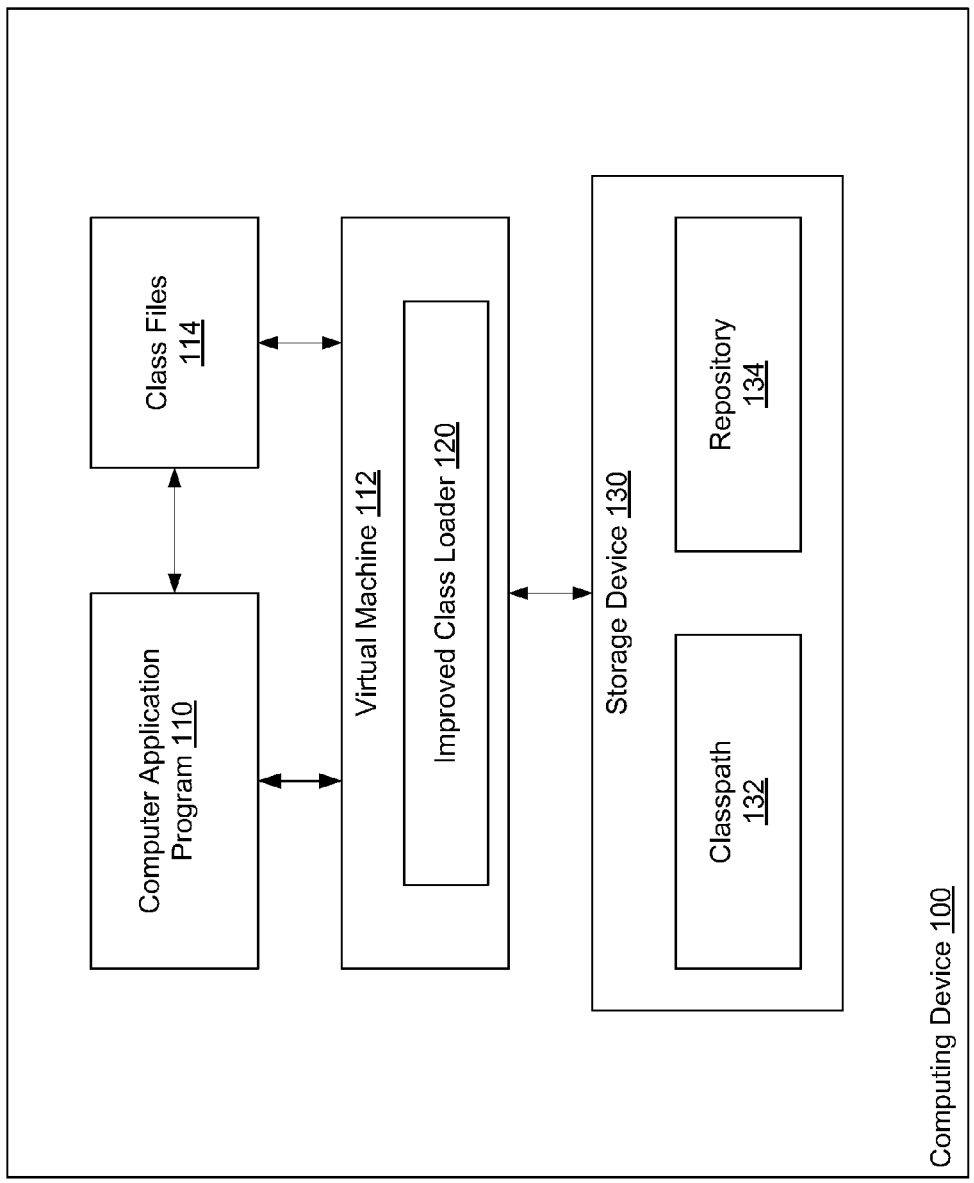
FIG. 1 is a block diagram illustrating a computing device to implement automatic runtime dependency lookup, according to an embodiment.

FIG. 1 is a block diagram illustrating a computing device to implement automatic runtime dependency lookup, according to an embodiment of the present invention. In one embodiment, computing device 100 includes a computer application program 110. Computer application program 110 may be written in any of a number of computer programming languages, such as for example, the Java programming language, the C# programming language (e.g., in the .NET Framework), or other computer programming language. Computer application program 110 may run on top of an operating system running on computing device 100. Embodiments of the automatic runtime dependency lookup described herein may work with any computer application program.

In one embodiment, computer application program 110 runs on a virtual machine 112 (e.g., a Java Virtual Machine (JVM)). Virtual machine 112 may enable a set of computer software programs and data structures to use a virtual machine model for the execution of other computer programs and scripts (such as the computer application program 110). Virtual machine 112 executes the code (e.g., Java bytecode) associated with computer application program 110. Virtual machine 112 may also include a just-in-time (JIT) compiler (not shown) which translates the code into native processor instructions at run-time and caches the code in memory during execution. This code may be the same no matter what hardware or operating system the program is running under. This may permit computer application program 110 to run on any platform that has a virtual machine available.

Virtual machine 112 may also include an improved class loader 120. Class loader 120 may be configured to load classes into the virtual machine 112 to provide uninterrupted execution of computer application program 110. Classes are pieces of code used to make up computer application program 110. In the case of a program written in the Java programming language (i.e., a Java application), source files (e.g., .java files) are compiled into virtual machine readable class files (which may have the .class extension). The classes may be stored as class files 114. Each class files 114 may include a list of other classes (i.e., "imports" or "import classes") that it depends on to run properly. The imports may be other class files, stored at a different location, that computer application program 110 uses while running.

Computing device 100 may also include storage device 130. Storage device 130 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. In one embodiment, storage device 130 includes classpath information 132 and repository information 134. Classpath information 132 may include a runtime list of classes and libraries (called "JAR files") used to locate every import class that the computer application program 110 uses to run. For example, the imports referenced in the list of classes in class files 114 may have a corresponding location included in classpath information 132. When an import class is needed, class loader 120 may read classpath information 132 to determine the location where the import class may be found. Classpath information 132 may be found, for example, in a JAR file at a folder or directory address (e.g., on a local filesystem of computing device 100). In one embodiment, the address may be provided by the user of computing device 100 when launching computer application program 110 (e.g., by entering the folder address into a command line). Repository information 134 may include alternate classpath information, which may be used during automatic runtime dependency lookup, if the import class is not found at the location specified by classpath information 132. The use of repository information 134 will be described further below.

Figure 2:
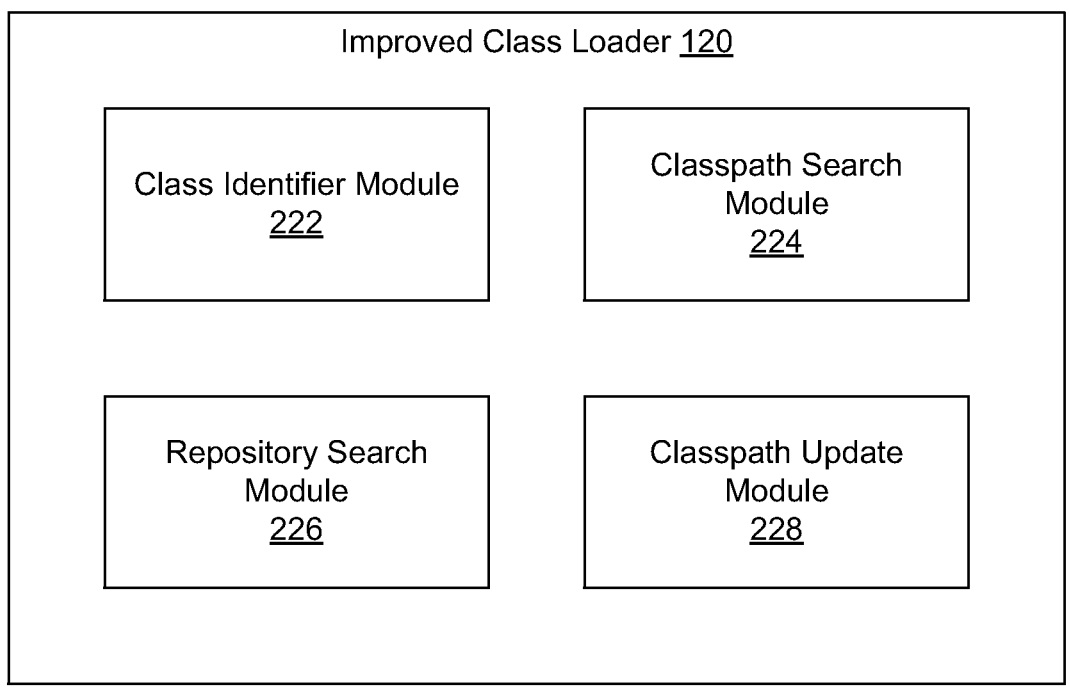
FIG. 2 is a block diagram illustrating an improved class loader for automatic runtime dependency lookup, according to an embodiment.

FIG. 2 is a block diagram illustrating an improved class loader for automatic runtime dependency lookup, according to an embodiment of the present invention. In one embodiment, class loader 120 may include class identifier module 222, classpath search module 224, repository search module 226 and classpath update module 228. Class identifier module 222 may read class files 114 to identify the import classes identified in the list of classes in each of class files 114. Classpath search module 224 may read classpath information 132 to determine the location of each of the import classes found by class identifier module 222. Repository search module 226 may read repository information 134 to determine an alternate location for each of the import classes in the event that the class is not found at the location specified in classpath information 132. Classpath update module 228 may update classpath information 132 with the correct location of the class as found in repository information 134.

Figure 3:
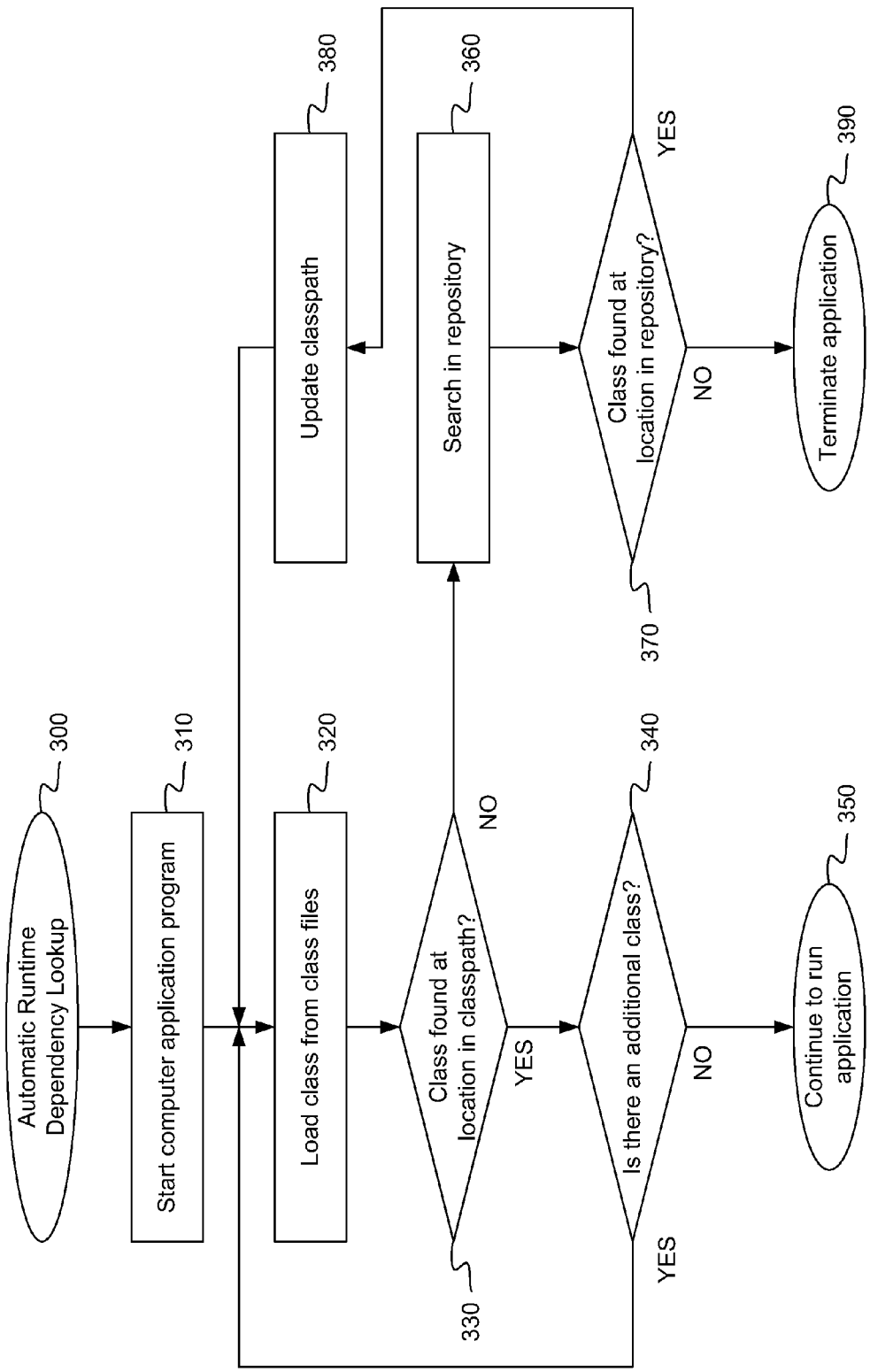
FIG. 3 is a flow diagram illustrating an automatic runtime dependency lookup method, according to an embodiment.

FIG. 3 is a flow diagram illustrating an automatic runtime dependency lookup method, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to automatically locate dependency information for import classes at runtime of a computer application program. In one embodiment, method 300 may be performed by improved class loader 120, as shown in FIGS. 1 and 2.

Referring to FIG. 3, at block 310, method 300 launches computer application program 110. Computer application program 110 may be launched and run by virtual machine 112. At block 320, method 300 loads a class. During class loading, class loader 120 may parse the Java bytecode of the application 110 into a native machine representation of the class and store the native representation in memory (not shown) of virtual machine 112. The class may be loaded in response to a request made by the computer application program 110. In one embodiment, the class may be an import class from a list of classes in class files 114. The class may be identified by class identifier module 222 of class loader 120. In addition, class loader 120 may initialize static members of the class, including variables that are shared between all instances of the class. At block 330, method 300 determines if the loaded class was found. The list of classes in class files 114 may include an identifier of the class, but the location of the class may be determined from classpath information 132. Classpath search module 224 of class loader 120 may determine the location and look for the class in the specified location.

If the class is found, at block 340, method 300 determines if there is an additional class to load. In one embodiment, the list of classes in class files 114 may include a plurality of import classes. If there are additional classes to load, method 300 returns to block 320 and repeats the steps at blocks 320-340 until all of the classes have been loaded and located. If there are no additional classes to load, at block 350, the computer application program continues to run in its normal course of operation.

If, at block 330, method 300 determines that the class was not found at the location specified in classpath information 132, method 300 proceeds to block 360. At block 360, method 300 searches repository information for information on an alternative location for the class. Repository search module 226 of improved class loader 120 may search repository information 134 for the location of the requested class. Repository information 134 may include a list of packages and the locations of their corresponding classes. In one embodiment the list of package names may include some names using a wildcard character, such as an asterisk "*," to indicate any package name starting with the listed name and any sub-packages. The locations may include addresses in a local file system or network accessible locations, such as a website. Repository information 134 may be created by a system administrator, user, the original application developer, or some other person. In one embodiment, repository information 134 is created at the time that computer application program 110 is initially installed on computing device 100. Repository information 134 may be updated (e.g., modified) any time that another application is installed on computing device 100. The list of package names and classes provides an alternative to those included directly in class files 114 and may be used to located missing classes as described above.

At block 370, method 300 determines if the class was found at the alternative location specified in the repository information 134. If the class was found, at block 380, method 300 updates the classpath information 132 with the correct location determined from repository information 134. Classpath update module 228 of class loader 120 may write the correct location into classpath information 132 over the original, incorrect location. Class loader 120 may attempt to load the class from that updated location at block 320 to enable uninterrupted execution of computer application program 110. The location may include, for example, a directory in computer system 100 or a network accessible location on a remote system. If at block 370, method 300 determines that the requested class was not at the alternative location, at block 390, method 300 causes an error, such as throwing a ClassNotFoundException and terminates computer application program 110.

Figure 4:
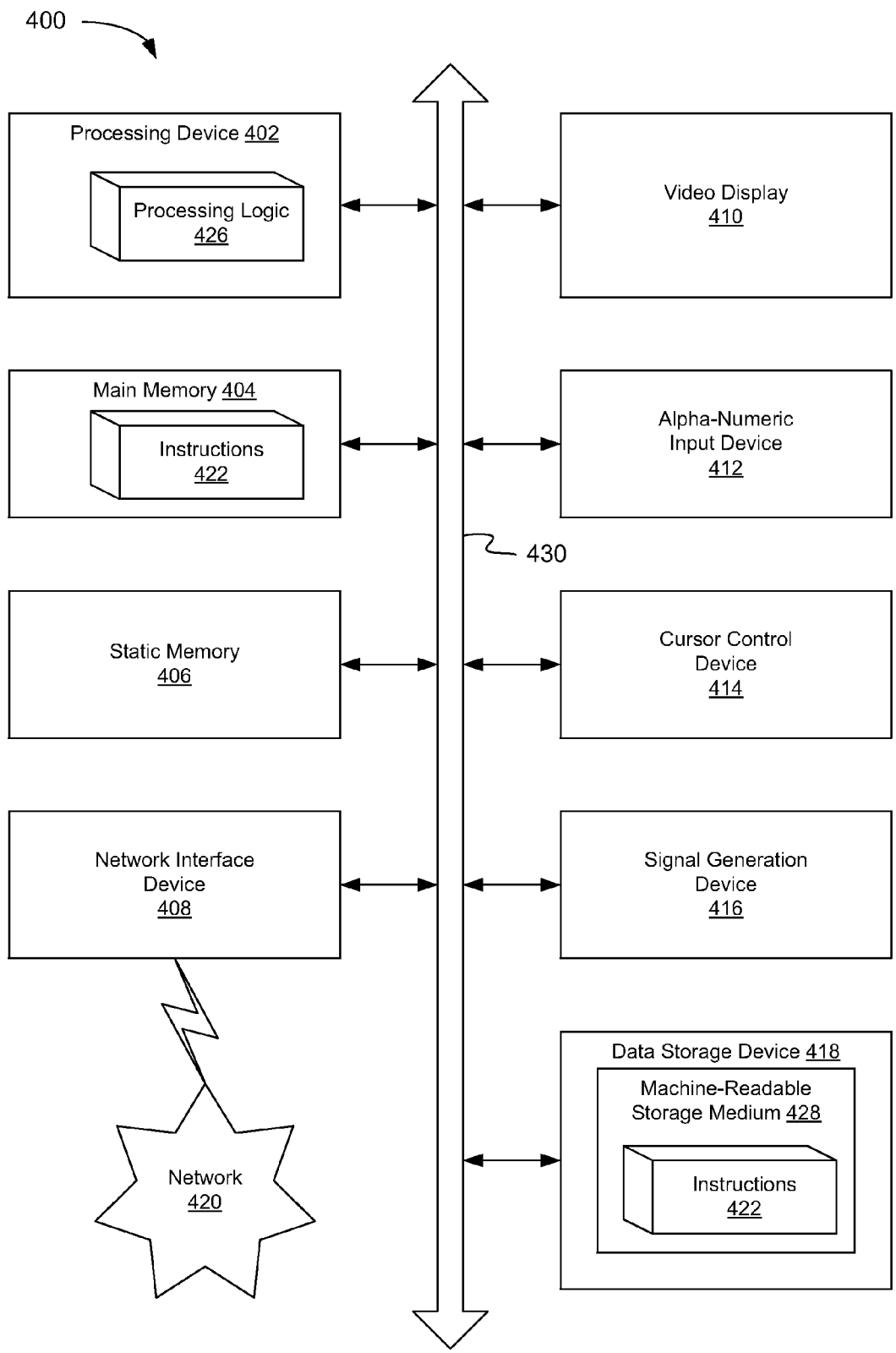
FIG. 4 is a block diagram illustrating one embodiment of a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method for automatic runtime dependency lookup, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
    while executing a computer application program, loading, by a processing device, a class file associated with the computer application program, wherein the class file depends on an import class file to run;
    examining classpath information associated with the computer application program;
    determining that the import class file is not found at a first location specified by the classpath information, the first location comprising at least one of a local directory or a network accessible location on a remote system;
    reading repository information to determine an alternate location for the import class file, wherein the alternate location for the import class file is different from the first location for the import class file, wherein the repository information comprises alternative classpath information that is stored separately and received independently from the classpath information;
    locating the import class file at the alternate location; and
    updating, by the processing device, the classpath information with the alternate location of the import class file by writing the alternate location over the first location in the classpath information.

2. The method of claim 1, further comprising:
    loading the import class file from the alternate location.

3. The method of claim 1, further comprising:
    throwing an exception and terminating the computer application program in response to the import class file not being found at the alternate location.

4. The method of claim 1, wherein the computer application program comprises a Java™ application.

5. A system comprising:
    a memory; and
    a processing device operatively coupled to the memory, the processing device to:
        load a class file associated with the computer application program, while the processing device is executing the computer application program, wherein the class file depends on an import class file to run;

examine classpath information associated with the computer application program;

determine that the import class file is not found at a first location specified by the classpath information, the first location comprising at least one of a local directory or a network accessible location on a remote system;

read repository information to determine an alternate location for the import class file, wherein the alternate location for the import class file is different from the first location for the import class file, wherein the repository information comprises alternative classpath information that is stored separately and received independently from the classpath information;

locate the import class file at the alternate location; and update the classpath information with the alternate location of the import class file by writing the alternate location over the first location in the classpath information.

6. The system of claim 5, wherein the processing device further to:
load the import class file from the alternate location.

7. The system of claim 5, wherein the processing device further to:
throw an exception and terminate the computer application program in response to the import class file not being found at the alternate location.

8. The system of claim 5, wherein the computer application program comprises a Java™ application.

9. A non-transitory machine-readable storage medium storing instructions which, when executed, cause a processing device to:

while executing a computer application program, load, by the processing device, a class file associated with the computer application program, wherein the class file depends on an import class file to run;

examine classpath information associated with the computer application program;

determine that the import class file is not found at a first location specified by the classpath information, the first location comprising at least one of a local directory or a network accessible location on a remote system;

read repository information to determine an alternate location for the import class file wherein the alternate location for the import class file is different from the first location for the import class file, wherein the repository information comprises alternative classpath information that is stored separately and received independently from the classpath information;

locate the import class file at the alternate location; and update, by the processing device, the classpath information with the alternate location of the import class file by writing the alternate location over the first location in the classpath information.

10. The storage medium of claim 9, wherein the instructions further cause the processing device to:
load the import class file from the alternate location.

11. The storage medium of claim 9, wherein the instructions further cause the processing device to:
throw an exception and terminating the computer application program in response to the import class file not being found at the alternate location.

12. The storage medium of claim 9, wherein the computer application program comprises a Java™ application.

* * * * *